United States Patent [19]
Kimura

[11] Patent Number: 5,887,672
[45] Date of Patent: Mar. 30, 1999

[54] CONSTRUCTION FOR ATTACHING A FRONT GRILLE SHIELD PLATE

[75] Inventor: Yuzuru Kimura, Hamamatsu, Japan

[73] Assignee: Suzuki Motor Corporation, Hamamatsu, Japan

[21] Appl. No.: 13,843

[22] Filed: Jan. 27, 1998

[30] Foreign Application Priority Data

Jan. 31, 1997 [JP] Japan ..................................... 9-018455

[51] Int. Cl.⁶ .................................................. B60K 11/00
[52] U.S. Cl. ........................ 180/68.1; 180/68.6; 403/353; 403/386
[58] Field of Search ................................ 180/68.6, 68.1; 403/353, 384, 386

[56] References Cited

FOREIGN PATENT DOCUMENTS

| 2355972 | 5/1974 | Germany | 180/68.6 |
|---|---|---|---|
| 31845 | 3/1981 | Japan | 180/68.6 |
| 404090927 | 3/1992 | Japan | 180/68.6 |

Primary Examiner—J. J. Swann
Assistant Examiner—Jim McClellan
Attorney, Agent, or Firm—Alston & Bird LLP

[57] ABSTRACT

An object of the present invention is to use the smallest possible number of bosses, screws, and nuts to install a shield plate to a front grille. To achieve this object, protruding members of grille protruding toward the rear of a vehicle body are provided at the upper edge of a back-side opening of a bumper grille. A protruding portion is provided at the end of the respective protruding member. An engagement hole vertically penetrating the protruding portion is provided in the protruding portion, and a step portion protruding downward from the height of the engagement hole is provided at the lower part of the end of the protruding portion. The shield plate is provided with insertion holes into which the protruding portions are inserted. A tongue is formed at the lower center of the insertion hole. The transverse movement of the shield plate is restricted by the insertion of the tongue into the engagement hole.

4 Claims, 9 Drawing Sheets

CONSTRUCTION FOR ATTACHING A FRONT GRILLE SHIELD PLATE

BACKGROUND OF THE INVENTION

1. Field of the Invention

The present invention relates to a construction for attaching a front grille shield plate.

2. Description of Related Art

Figure 10:
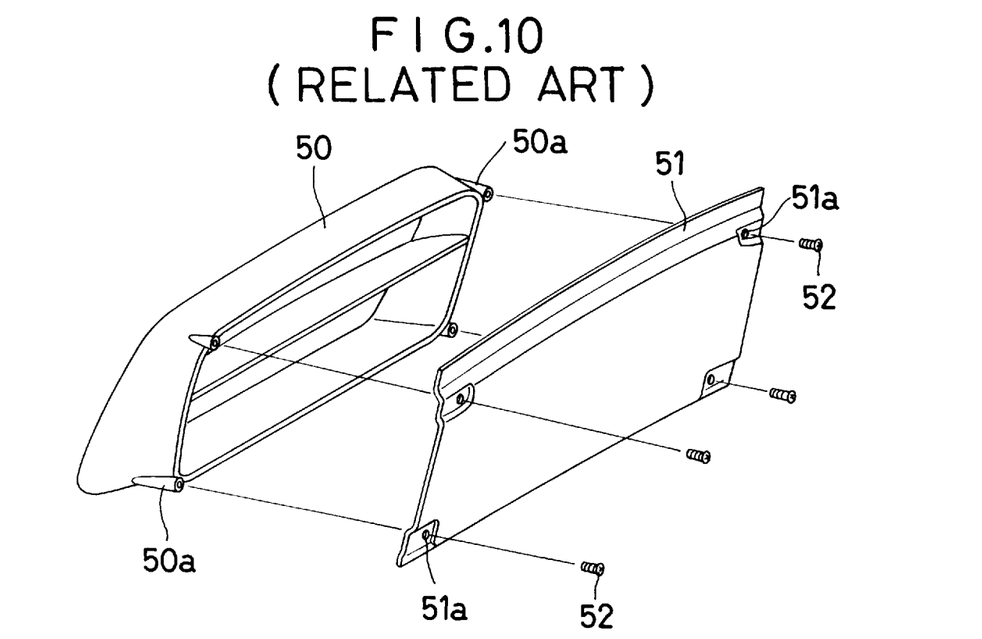
FIG. 10 is a perspective view showing a state in which a shield plate is being attached to the back side of a conventional bumper grille.

FIG. 10 shows a front grille 50 and a shield plate 51 attached to the back side thereof. As shown in the figure, the front grille 50 is provided with cylindrical bosses 50a at four corners of a back-side opening of the front grille 50. The shield plate 51 is fixed to the front grille 50 by putting screws 52 through screw holes 51a provided corresponding to the cylindrical bosses 50a and threadedly installing the screws 52 to the cylindrical bosses 50a.

Figure 11:
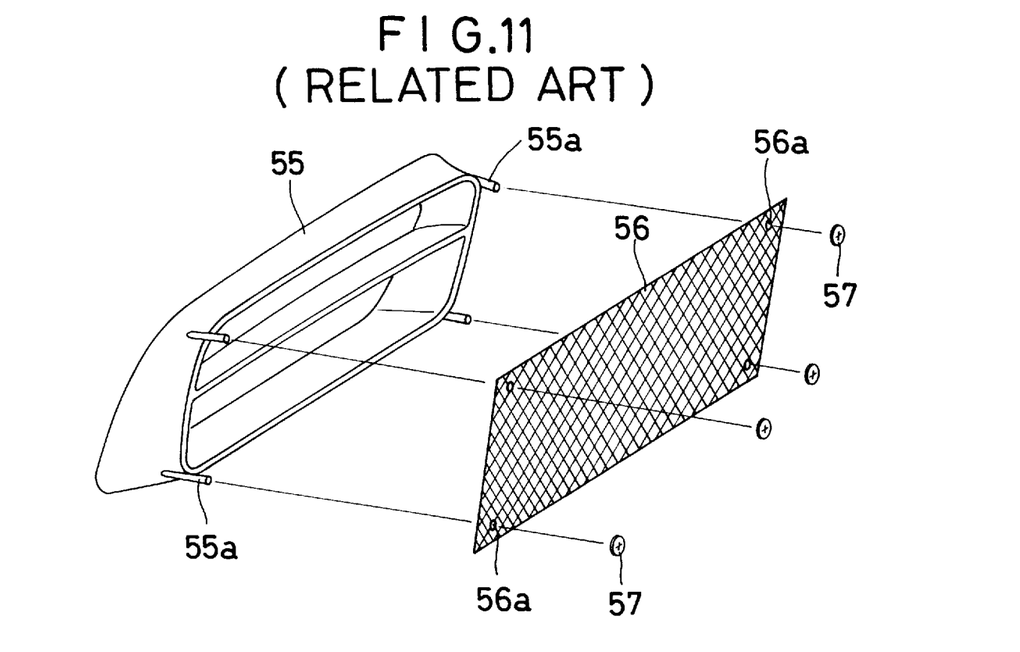
FIG. 11 is a perspective view showing a state in which a grille net is being attached to the back side of the conventional bumper grille.

FIG. 11 shows a front grille 55 and a grille net 56 attached to the back side thereof. As shown in the figure, the front grille 55 is provided with rod-shaped bosses 55a at four corners of an opening thereof. The grille net 56 is fixed to the front grille 55 by putting rod-shaped bosses 55a through attaching holes 56a and threadedly installing nuts 57 to the rod-shaped bosses 55a.

However, when the cylindrical bosses or rod-shaped bosses are formed to the front grille, shrinkage sometimes occurs on the surface thereof. Therefore, it is desirable to reduce the number of bosses. Also, the use of many screws or nuts increases the number of parts and installation man-hour. In particular, if the engine room is small, a tool for tightening the screws, such as a screwdriver, sometimes interferes with other parts, which makes the work difficult to do.

SUMMARY OF THE INVENTION

The present invention was made to solve the above problems, and accordingly an object thereof is to provide a construction for attaching a front grille shield plate, in which a shield plate and grille net can be installed to a front grille by using the smallest possible number of bosses, screws, and nuts.

To achieve the above object, the present invention provides a construction for attaching a front grille shield plate in which a shield plate for covering an opening of a front grille is attached to the back side of the opening, characterized in that a protruding portion protruding rearward from the upper back side of the opening is provided, an engagement hole vertically penetrating the protruding portion is provided, an insertion hole into which the protruding portion is inserted is provided in the shield plate, and a tongue, which is engaged with the engagement hole by moving the shield plate upward, is provided in the insertion hole to restrict the transverse movement of the shield plate.

In this specification, the front grille of an automobile includes a single grille and a grille formed integrally with a bumper (hereinafter referred to as a bumper grille). The following description is given by using the bumper grille.

DETAILED DESCRIPTION OF THE PREFERRED EMBODIMENTS

A construction for attaching a front grille shield plate in accordance with an embodiment of the present invention will be described with reference to the accompanying drawings.

Figure 1:
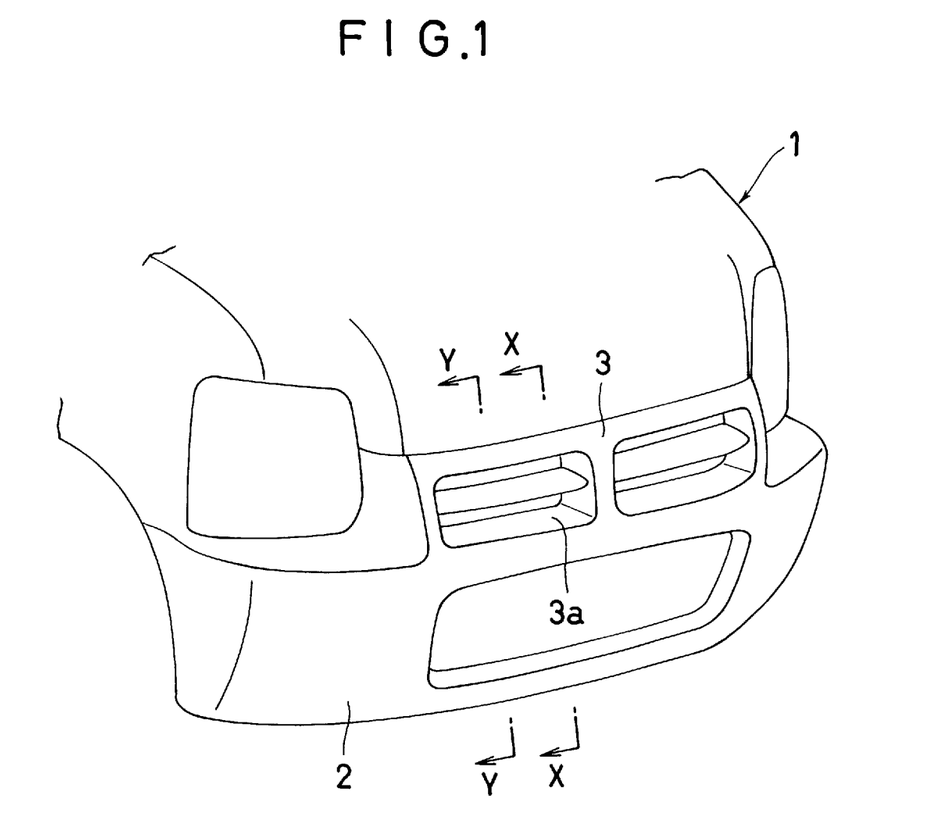
FIG. 1 is a perspective view of a bumper grille viewed from the front of automobile.
Figure 2:
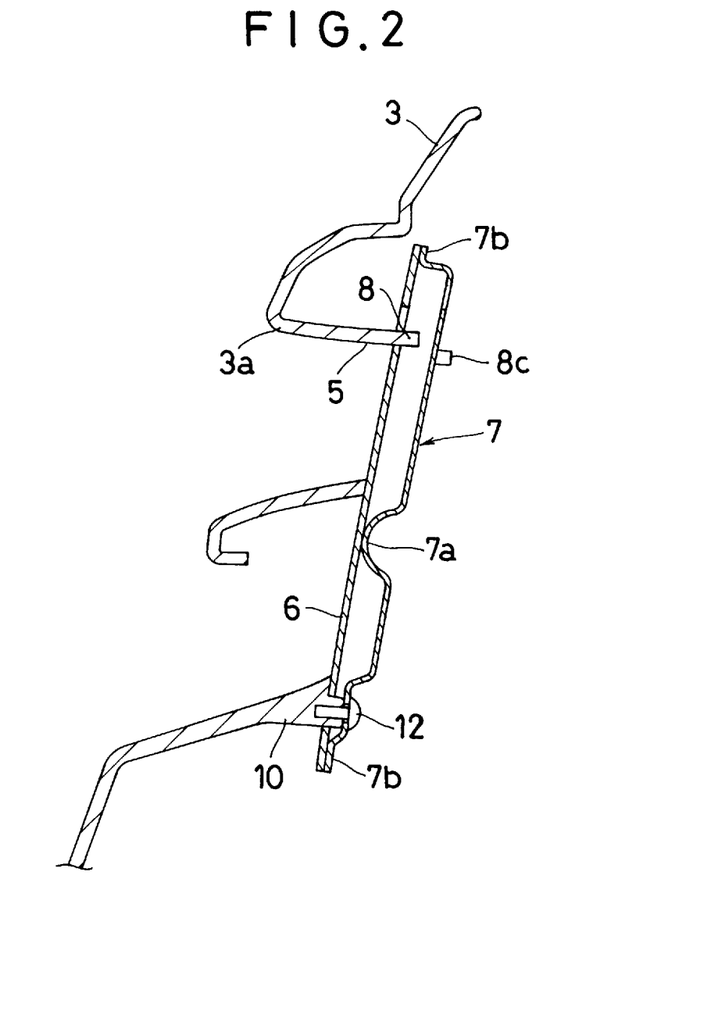
FIG. 2 is an enlarged sectional view taken along the line X—X of FIG. 1.
Figure 3:
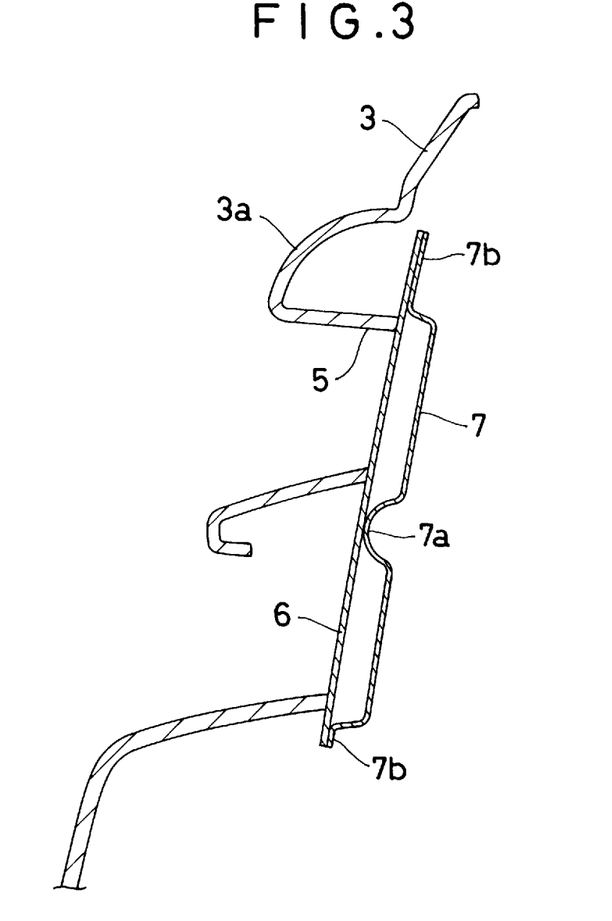
FIG. 3 is an enlarged sectional view taken along the line Y—Y of FIG. 1.
Figure 4:
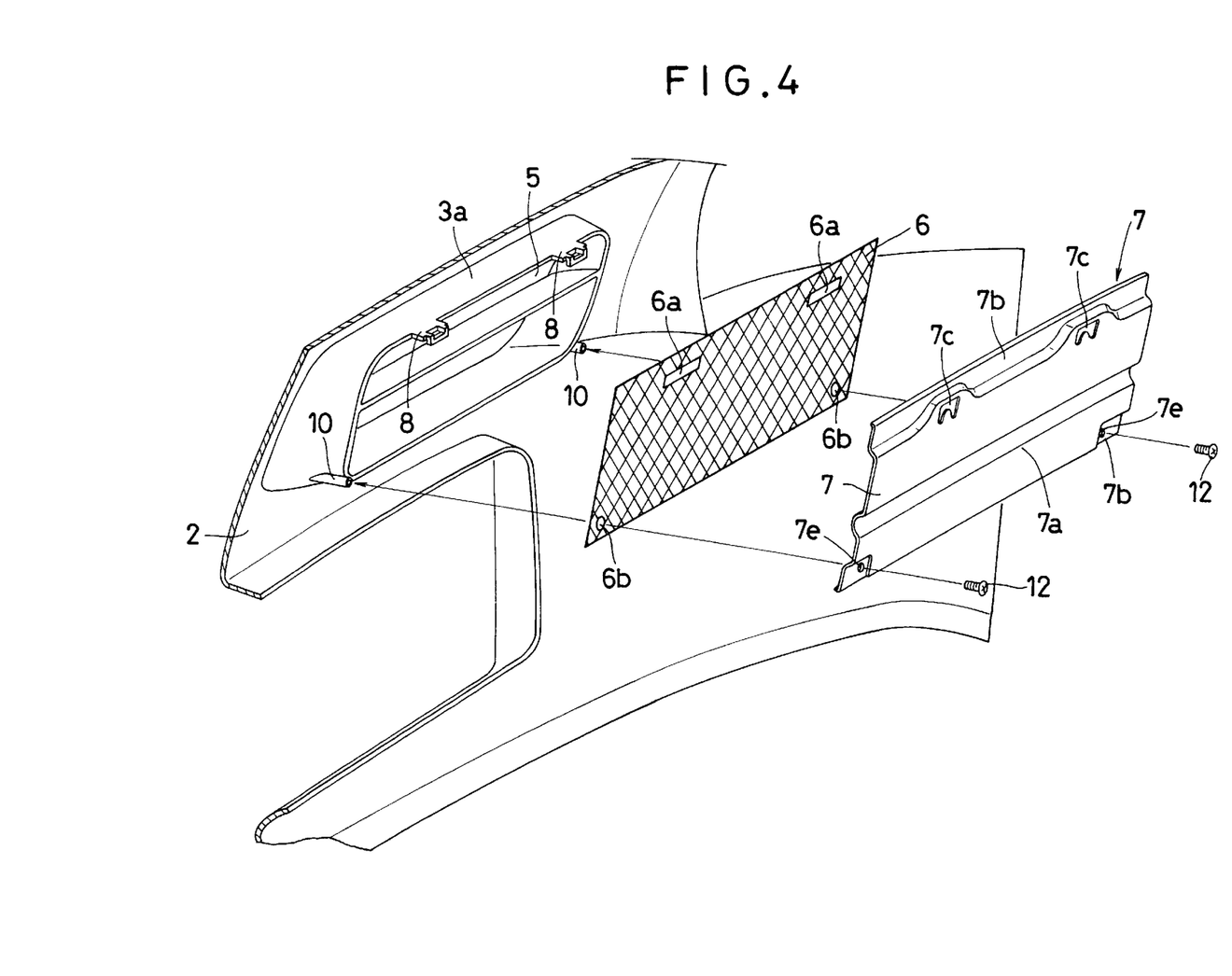
FIG. 4 is an exploded perspective view of a grille net and shield plate disposed on the back side of the bumper grille.

FIG. 1 shows a front portion 1 of an automobile. The front portion 1 is fitted with a bumper 2, and a bumper grille 3 is integrally provided at the upper part of the bumper 2. FIGS. 2 and 3 are sectional views of the grille 3a on the left, and FIG. 4 is an exploded perspective view of the back side of the grille 3a. As shown in FIG. 4, a grille net 6 of cross-hatched mesh is disposed on the rear side of the grille 3a. A shield plate 7 covering the back-side opening 5 is disposed on the rear side of the grille net 6.

The following is a detailed description of a construction for attaching the grille net 6 and the shield plate 7.

Figure 5:
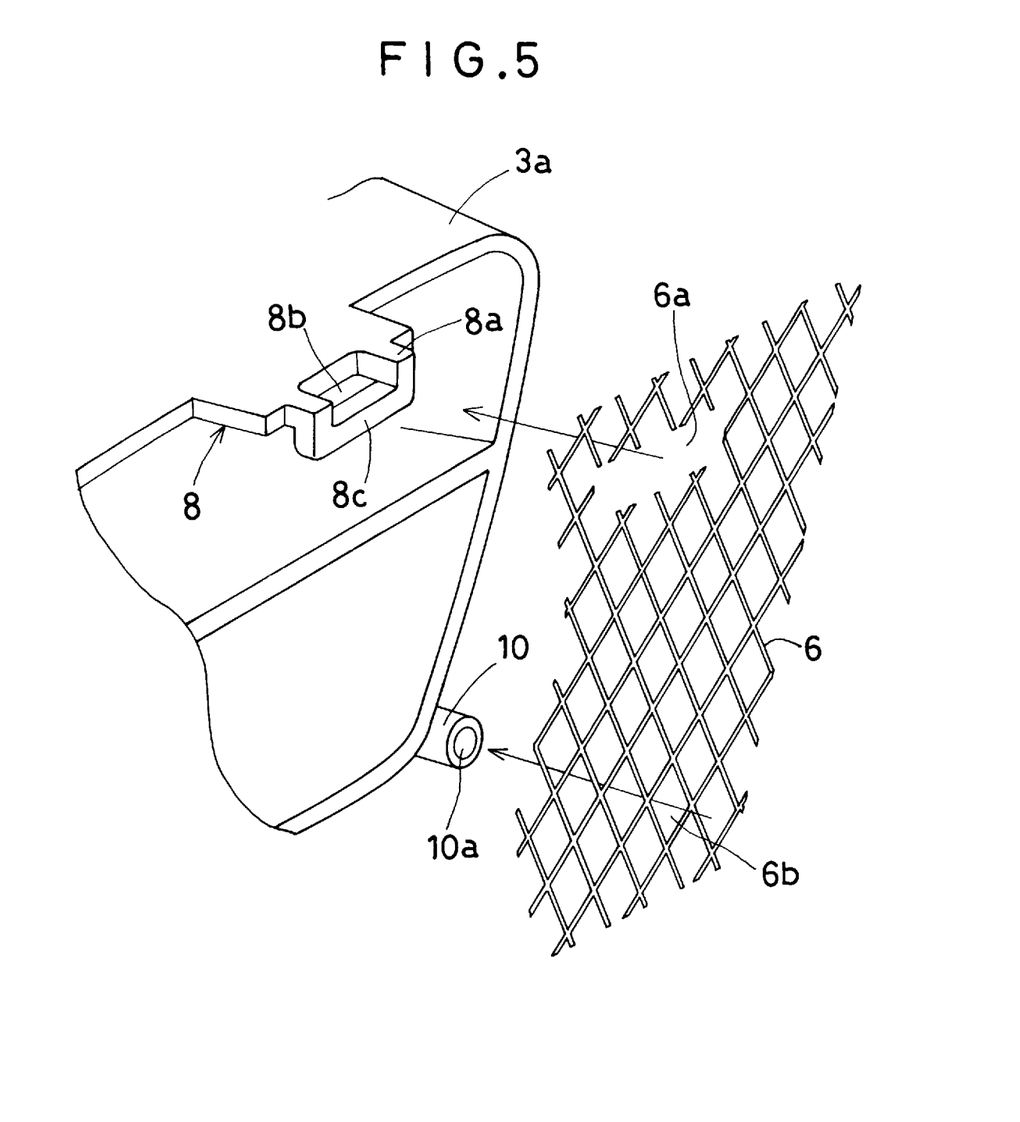
FIG. 5 is a perspective view showing a state in which the grille net is being attached to a protruding member on the back side of the bumper grille.
Figure 6:
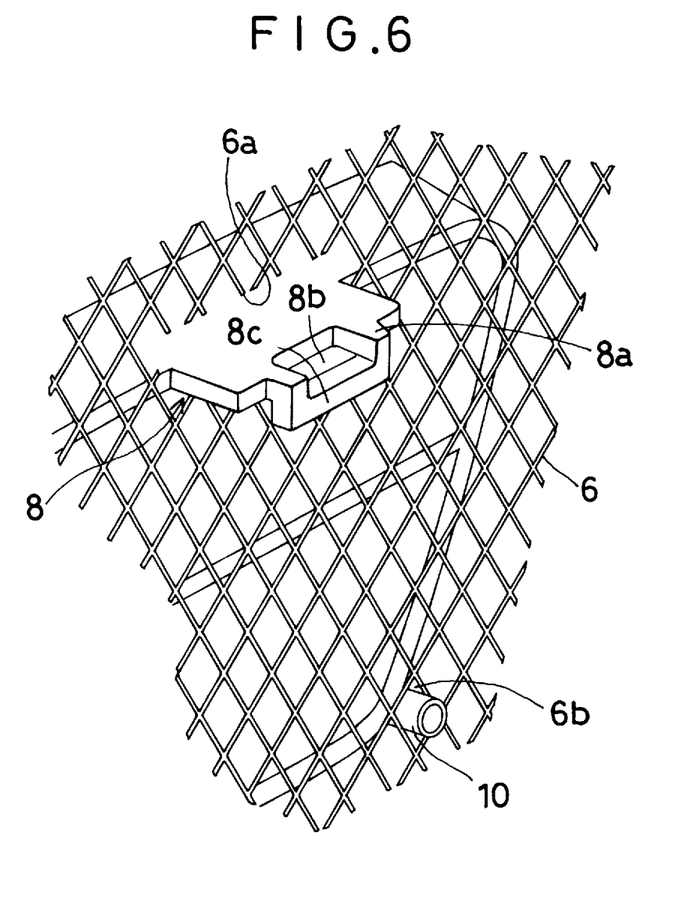
FIG. 6 is a perspective view showing a state in which the grille net is installed to the protruding member on the back side of the bumper grille.

As shown in FIGS. 5 and 6, protruding members 8, which are molded integrally with the grille 3a so as to protrude toward the rear of a vehicle body and have the same thickness as that of the grille 3a, are provided at the upper edge of the back-side opening 5 of the grille 3a. At the end of the protruding member 8 is provided a protruding portion 8a further protruding from the protruding member 8. An engagement hole 8b, vertically penetrating the protruding portion 8a, is formed in the protruding portion 8a, and a step portion 8c protruding downward from the rear of the engagement hole 8b is provided at the lower part of the end of the protruding portion 8a. Also, cylindrical bosses 10 molded integrally with the grille 3a are provided at the lower sides of the back-side opening 5 of the grille 3a, and a threaded hole 10a for screw is formed in the cylindrical boss 10. As shown in FIG. 4, the protruding members 8 and the cylindrical bosses 10 are provided in a pair at the right and left of the grille 3a.

As shown in FIG. 4, the grille net 6, being a mesh plate, is fixed to the back side of the grille 3a so as to be held between the grille 3a and the shield plate 7. As shown in FIGS. 5 and 6, rectangular elongated holes 6a into which the protruding member 8 can be inserted are formed at the upper part of the grille net 6, and screw holes 6b are formed at positions corresponding to the cylindrical bosses 10 at the lower part thereof. The screw holes 6b are not needed if the mesh holes of the grille net 6 can be used as the screw holes. As shown in FIG. 4, the elongated holes 6a and the screw holes 6b are provided in a pair at the right and left of the grille net 6.

As shown in FIG. 4, the shield plate 7 has a U-shaped cross section having flanges 7b at the upper and lower end and almost the same size as that of the grille net 6. A bead 7a is formed in the transverse direction at the center of the shield plate 7.

Figure 7:
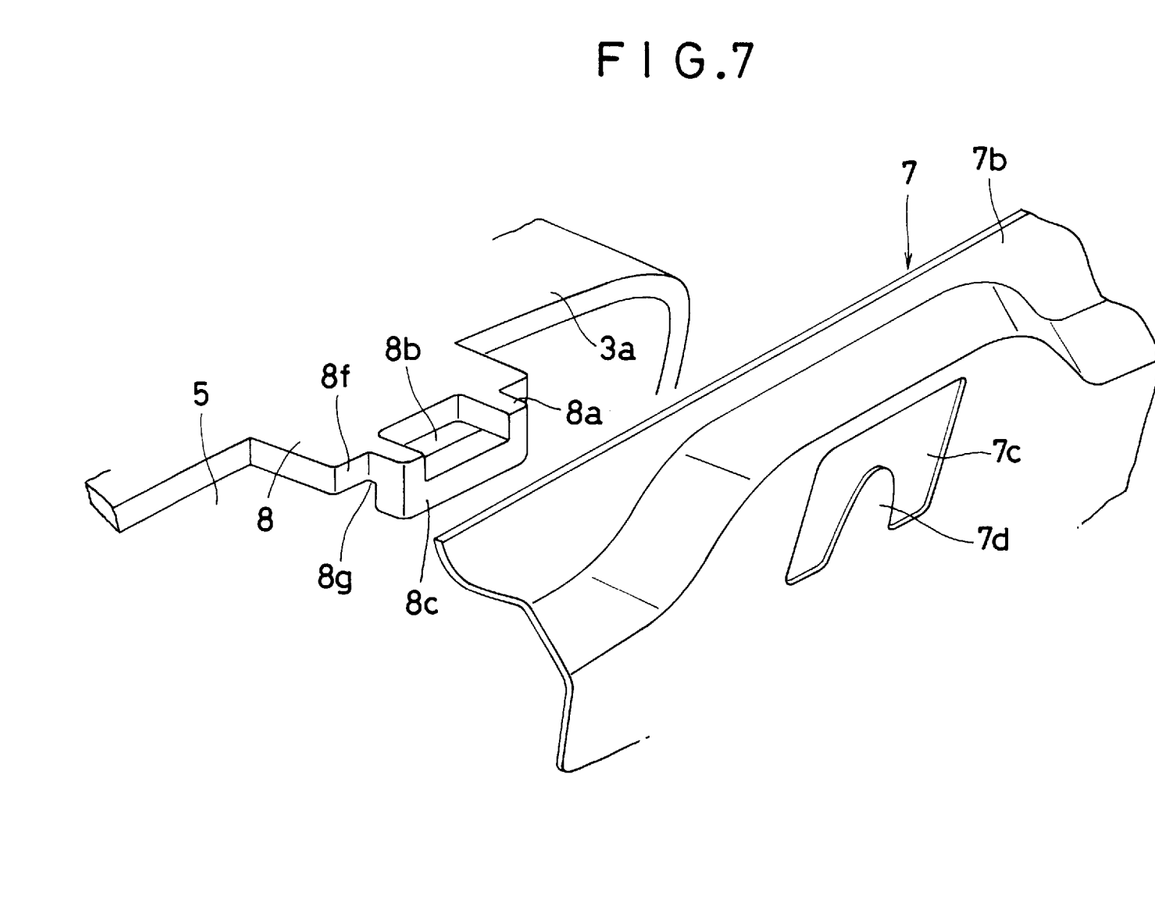
FIG. 7 is a perspective view showing a state in which the shield plate is being attached to the protruding member on the back side of the bumper grille.
Figure 8:
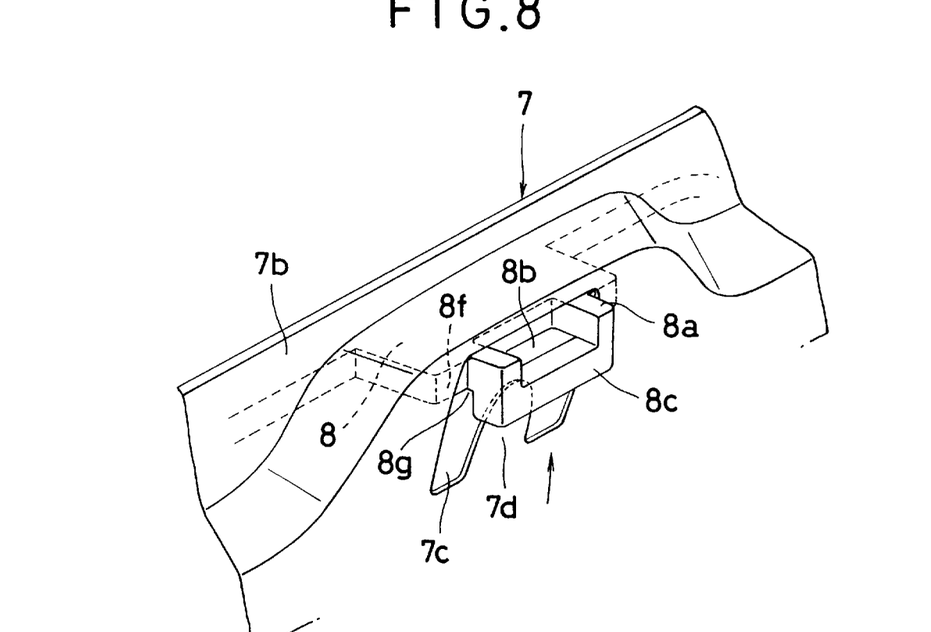
FIG. 8 is a perspective view showing a state in which the shield plate is installed to the protruding member on the back side of the bumper grille.
Figure 9:
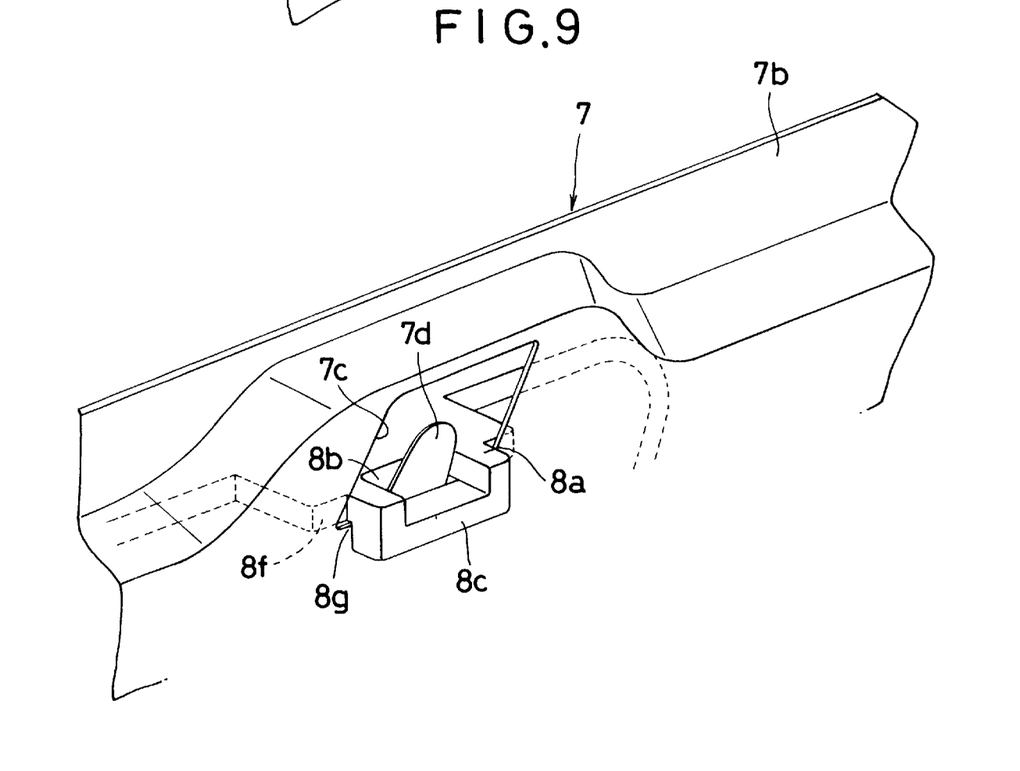
FIG. 9 is a perspective view showing a state in which a tongue of the shield plate is engaged with the protruding member on the back side of the bumper grille.

As shown in FIGS. 7 to 9 (in these figures, the grille net is omitted), the shield plate 7 is formed with insertion holes 7c into which the protruding portion 8a is inserted at positions corresponding to the protruding portions 8a in installation. The width of the insertion hole 7c is approximately equal to that of the protruding portion 8a.

A tongue 7d protruding upward is formed at the lower of the insertion hole 7c. The width of the tongue 7d increases from the top to the middle position and is equal in the range from the middle position to the bottom. When the shield plate 7 is installed to the protruding portions 8a, the tongue 7d is disposed just under the engagement hole 8b. The portion of the shield plate 7, where the insertion hole 7c is formed, has a decreased width of flange 7b.

As shown in FIG. 4, screw holes 7e are provided at positions corresponding to the cylindrical bosses 10 of the grille 3a in installation at the lower sides of the shield plate 7. As shown in FIG. 4, the insertion holes 7c and the screw holes 7e are provided in a pair at the right and left of the shield plate 7.

Next, a procedure for installing the grille net 6 and the shield plate 7 to the grille 3a will be described.

As shown in FIG. 5, first, the elongated holes 6a and the screw holes 6b of the grille net 6 are aligned with the protruding members 8 and the cylindrical bosses 10 of the grille 3a. As shown in FIG. 6, the protruding members 8 are inserted into the elongated holes 6a so that the grille net 6 is hung on the protruding members 8.

Subsequently, the screw holes 6b of the grille net 6 are fitted on the cylindrical bosses 10 of the grille 3a.

Next, the shield plate 7 is installed to the grille 3a in the order shown in FIGS. 7 to 9. Specifically, the insertion holes 7c of the shield plate 7 are first fitted on the protruding portions 8a of the grille 3a.

At this time, as shown in FIG. 8, the transverse movement of the shield plate 7 is substantially restricted by the contact of the right and left side edges of the insertion hole 7c with the right and left sides of the protruding portion 8a, so that the shield plate 7 is temporarily fixed to the grille 3a. The longitudinal movement of the shield plate 7 is restricted by the contact of the front surface of the shield plate 7 with the rear end 8f of the protruding member 8. Also, the shield plate 7 is temporarily fixed to the grille 3a by the upper end of the insertion hole 7c resting on the upper face of the protruding portion 8a.

When the shield plate 7 is slid upward from this temporarily fixed state, as shown in FIG. 9, the tongue 7d engages with the engagement hole 8b, by which the transverse movement of the shield plate 7 is completely restricted. The upward movement of the shield plate 7 is restricted by the contact of the lower edge of the insertion hole 7c with the lower face 8g of the protruding portion 8a forming the engagement hole 8b. The backward movement of the shield plate 7 is restricted by the contact of the rear surface of the shield plate 7 with the step portion 8c. In this state, the lower parts of the shield plate 7 are fixed to the cylindrical bosses 10 by means of screws 12 shown in FIG. 4 with the grille net being held between the grille 3a and the shield plate 7, thus the installation of the shield plate 7 is completed. The flanges 7b and the bead 7a of the shield plate 7 restrict the longitudinal movement of the grille net 6.

In order to install the grille net 6, the upper part may be fixed by means of the screws and the protruding portions may be formed at the lower part.

The above is the description of one embodiment of the present invention. Needless to say, the present invention is not limited to this embodiment, and various modifications can be made on the basis of the technical concept of the present invention.

For example, although the step portion 8c formed at the end of the protruding portion 8a is provided at the lower part of the protruding portion 8a in the above embodiment, the same effect can be achieved even by protruding the step portion 8c upward and protruding the tongue 7d, which is formed in the insertion hole 7c of the shield plate 7, downward from the upper edge of the insertion hole 7c.

As described above, according to the present invention, the upper part of the shield plate is fixed by engaging the tongues formed in the insertion holes in the shield plate with the engagement holes formed on the back side of the front grille, so that the number of cylindrical bosses can be reduced. Therefore, the number of shrinkages on the surface of the front grille can be reduced due to the reduction in the number of cylindrical bosses. Likewise, since the number of cylindrical bosses is reduced, the shield plate can be installed to the front grille with the smallest possible number of screws and nuts, so that the work man-hour can be decreased.

What is claimed is:

1. A front grille assembly comprising:
    a front grille having an opening which extends through the front grille from a front side to a back side thereof, the front grille including a protruding member which protrudes rearwardly from the backside of the front grille adjacent the opening, the protruding member including a vertically extending engagement hole, the protruding member including first and second protruding portions, wherein said second protruding portion includes said engagement hole and wherein said first protruding member includes an abutment surface for a shield plate; and
    said shield plate for attachment to the back side of the front grille to cover the opening therein, the shield plate including an insertion hole which receives the protruding member, the insertion hole having a tongue which engages the engagement hole in the protruding member upon vertically moving the shield plate with respect to the front grille so as to restrict transverse movement of the shield plate.

2. The front grille assembly of claim 1 wherein the protruding member includes a step portion which protrudes downwardly therefrom adjacent a rear edge of the engagement hole, the step portion being configured to contact a back surface of the shield plate for restricting rearward movement thereof.

3. The front grille assembly of claim 2, further comprising a grille net adapted to be positioned between the shield plate and the opening in the front grille, and wherein the shield plate is substantially U-shaped in cross section and includes flanges formed at upper and lower portions of the shield plate and a bead formed at a middle portion of the shield plate, the flanges and the bead being configured to contact the grille net, the shield plate further including a hole in the lower portion thereof for passage of a fastener through the shield plate into the front grille for fixing the assembly together.

4. The front grille assembly of claim 1, further comprising a grille net adapted to be positioned between the shield plate and the opening in the front grille, and wherein the shield plate is substantially U-shaped in cross section and includes flanges formed at upper and lower portions of the shield plate and a bead formed at a middle portion of the shield plate, the flanges and the bead being configured to contact the grille net, the shield plate further including a hole in the lower portion thereof for passage of a fastener through the shield plate into the front grille for fixing the assembly together.

* * * * *